US008279743B2

(12) United States Patent  (10) Patent No.: US 8,279,743 B2
Jonsson  (45) Date of Patent: Oct. 2, 2012

(54) METHOD FOR INTERFERENCE ESTIMATION FOR ORTHOGONAL PILOT PATTERNS

(75) Inventor: Elias Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1264 days.

(21) Appl. No.: 11/756,172

(22) Filed: May 31, 2007

(65) Prior Publication Data

US 2008/0298227 A1  Dec. 4, 2008

(51) Int. Cl.
*H04J 11/00* (2006.01)
*H04B 7/185* (2006.01)
*H04B 3/10* (2006.01)
*H04B 1/00* (2006.01)

(52) U.S. Cl. ........ 370/208; 370/317; 370/491; 375/130; 375/148; 375/346

(58) Field of Classification Search .......... 370/203–210, 370/317, 480–481, 491, 500; 375/140–148, 375/316, 346–351
See application file for complete search history.

(56) References Cited

U.S. PATENT DOCUMENTS

| | | | |
|---|---|---|---|
| 7,145,935 B2 | 12/2006 | Won et al. | |
| 7,280,467 B2 * | 10/2007 | Smee et al. | 370/208 |
| 7,756,007 B2 * | 7/2010 | Nicoli et al. | 370/210 |
| 2005/0265222 A1 | 12/2005 | Gerlach | |
| 2006/0120272 A1 | 6/2006 | Wang et al. | |
| 2006/0209973 A1 | 9/2006 | Gorokhov et al. | |
| 2006/0270416 A1 | 11/2006 | Perets et al. | |
| 2007/0042784 A1 | 2/2007 | Anderson | |
| 2007/0092015 A1 | 4/2007 | Hart et al. | |
| 2007/0127588 A1 * | 6/2007 | Kim | 375/267 |
| 2007/0195906 A1 * | 8/2007 | Kim et al. | 375/267 |
| 2008/0219325 A1 * | 9/2008 | Sambhwani | 375/136 |
| 2010/0074152 A1 * | 3/2010 | Jalali et al. | 370/280 |
| 2011/0069737 A1 * | 3/2011 | Jalali | 375/130 |

FOREIGN PATENT DOCUMENTS

| | | |
|---|---|---|
| EP | 1221777 A1 | 7/2002 |
| EP | 1363434 | 11/2003 |
| EP | 1 4999 059 A1 * | 1/2005 |
| EP | 1499059 A1 | 1/2005 |
| WO | 02/09304 | 1/2002 |

OTHER PUBLICATIONS

Muneta, S. et al. "A New Frequency-Domain Link Adaptation Scheme for Broadband OFDM Systems." Vehicular Technology Conference, 1999. VTC 1999-Fall. Proceedings of the 50th IEEE VTC, Amsterdam, Netherlands. Sep. 19-22, 1999. vol. 1, pp. 253-257. XP 010352833. IEEE: Piscataway, NJ. USA.
"International Search Report," International Application No. PCT/EP2008/004196, mailed Nov. 11, 2008. European Patent Office, Rijswijk, Netherlands.

* cited by examiner

*Primary Examiner* — Habte Mered
(74) *Attorney, Agent, or Firm* — Coats & Bennett, P.L.L.C.

(57) ABSTRACT

In an OFDM communications system receiver, channel estimates are processed to remove or reduce noise, exploiting the orthogonality of pilot patterns. The de-noised channel estimates are then used to compute inter-cell interference. The noise effects of orthogonal pilot patterns are selectively removed from channel samples in estimating inter-cell interference, depending on whether data subcarriers are subject to the same interference as pilot subcarriers, and whether data subcarriers are subject to interference from sectors with pilot patterns orthogonal to those in the transmitting sector. A further calculation removes noise from cells not identified by an orthogonal pilot sequence, which may be particularly applicable when large variations exist in the frequency domain of the propagation channel across a pilot pattern.

30 Claims, 3 Drawing Sheets

METHOD FOR INTERFERENCE ESTIMATION FOR ORTHOGONAL PILOT PATTERNS

FIELD OF THE INVENTION

The present invention relates generally to wireless communications, and in particular to a system and method for suppressing inter-cell interference in an Orthogonal Frequency Division Multiplexing (OFDM) wireless communication system receiver.

BACKGROUND

In an Orthogonal Frequency Division Multiplexing (OFDM) wireless communication systems, known symbols referred to as pilot symbols, or pilots, are transmitted across the time-frequency plane for the receiving device to estimate the propagation channel's time-frequency response in order to perform coherent demodulation of data symbols. OFDM systems may use orthogonal patterns of pilot symbols in different transmission sectors (and/or cells), to differentiate communication signals transmitted in the respective sectors. To a receiver in a given sector of interest—and in particular to receivers at or near sector boundaries—transmissions directed to other sectors appear as noise, which must be suppressed for acceptable receiver performance. Effective suppression of inter-sector (also referred to as inter-cell) interference is an ongoing challenge in OFDM receiver design.

SUMMARY

According to one or more embodiments, in an OFDM communications system receiver, channel estimates are processed to remove or reduce noise, exploiting the orthogonality of pilot patterns. The de-noised channel estimates are then used to compute inter-cell interference. The noise effects of orthogonal pilot patterns are selectively removed from channel samples in estimating inter-cell interference, depending on whether data subcarriers are subject to the same interference as pilot subcarriers, and whether data subcarriers are subject to interference from sectors with pilot patterns orthogonal to those in the transmitting sector. A further calculation removes noise from cells not identified by an orthogonal pilot sequence, which may be particularly applicable when large variations exist in the frequency domain of the propagation channel across a pilot pattern.

One embodiment relates to a method of accurately estimating inter-cell interference in a received signal transmitted in a given sector in an OFDM communication system receiver. When pilot and data subcarriers are subject to the same interference and the propagation channel is approximately constant across subcarriers spanned by a predetermined number of consecutive pilot signals that are orthogonal across sectors, the received signal is processed to generate a first set of propagation channel samples that remove the effects of orthogonal pilot patterns. A propagation channel estimate is generated from the first set of propagation channel samples. The received signal is processed to generate a second set of propagation channel samples that include the effects of orthogonal pilot patterns. Inter-cell interference in the received signal is estimated by subtracting the propagation channel estimate from the second propagation channel samples.

When pilot subcarriers are shared with other sectors, data subcarriers are not subject to substantial interference from sectors with pilot patterns orthogonal to the given sector, and the propagation channel is approximately constant across subcarriers spanned by a predetermined number of consecutive pilot signals that are orthogonal across sectors, inter-cell interference in the received signal is estimated by subtracting the propagation channel estimate from the first propagation channel samples.

When the propagation channel is not constant in frequency across subcarriers spanned by a predetermined number of consecutive pilot signals that are orthogonal across sectors, the received signal is processed to generate a third set of propagation channel samples that remove noise not identified by a cell specified by the orthogonal pilot pattern, and inter-cell interference in the received signal is estimated by subtracting the third propagation channels samples from the second propagation channel samples.

Another embodiment relates to an OFDM communication system receiver. The receiver includes a receiver operative to receive a signal transmitted in a given sector. The receiver also includes a channel estimation circuit operative to detect when pilot and data subcarriers are subject to the same interference and the propagation channel is approximately constant across subcarriers spanned by a predetermined number of consecutive pilot signals that are orthogonal across sectors, and to process the received signal to generate a first set of propagation channel samples that remove the effects of orthogonal pilot patterns. The channel estimation circuit is further operative to generate a propagation channel estimate from the first set of propagation channel samples, and to process the received signal to generate a second set of propagation channel samples that include the effects of orthogonal pilot patterns. The channel estimation circuit is still further operative to estimate inter-cell interference in the received signal by subtracting the propagation channel estimate from the second propagation channel samples.

DETAILED DESCRIPTION

As used herein, the following notation and abbreviations have the following meaning:

If x is a complex variable, x* denotes its conjugate. If x is a vector, $x^t$ denotes its transpose and $x^H$ its Hermitian transpose, that is, transpose and complex conjugate. If x is a random variable, the expectation value is denoted as E(x). If x is a vector then its Euclidian norm is denoted as $\|x\|$.

$N_{Rx}$: Number of receive antennas.

$N_{Tx}$: Number of transmit antennas.

$h_{i,j}(l,n)$: The impulse response of the downlink propagation channel corresponding to the j-th transmit antenna and the i-th receive antenna, at time t=nT. In this notation, $0 \leq l \leq L$ denotes the various taps in the impulse response of the propagation channel and T is the sampling rate in the digital baseband. The sub-script indices (i,j) are omitted when there is only one transmit and receive antenna.

$H_{i,j}(k,n)$: The time-varying frequency response of the propagation channel given by $h_{i,j}(l,n)$. Here k indexes the subcarriers and n the time. The sub-script indices (i,j) are omitted when there is only one transmit and receive antenna.

$H_{i,j}^{PcE}(k,n_{sym})$: The estimated propagation channel in frequency domain corresponding to the j-th transmit antenna, the i-th receive antenna, frequency subcarrier k, and OFDM-symbol $n_{sym}$. The sub-script indices (i,j) are omitted when there is only one transmit and receive antenna.

$I_i(n_{sym})$: The estimated inter-cell interference as seen from receive antenna i and OFDM-symbol $n_{sym}$.

$y_i(n)$: The received sampled digital base-band signal from receive antenna i and for digital base-band sample n. The sub-script i is omitted when there is only one receive antenna.

$Y_i(k,n_{sym})$: The frequency response of $y_i(n)$ for subcarrier k and OFDM-symbol $n_{sym}$. The sub-script i is omitted when there is only one receive antenna.

$W_{i,j}^{PcE}(k,n_{sym})$: The weighted channel estimates used in a combiner corresponding to the j-th transmit antenna, the i-th receive antenna, subcarrier k, and OFDM-symbol. The sub-script indices (i,j) are omitted when there is only one transmit and receive antenna.

Figure 1:
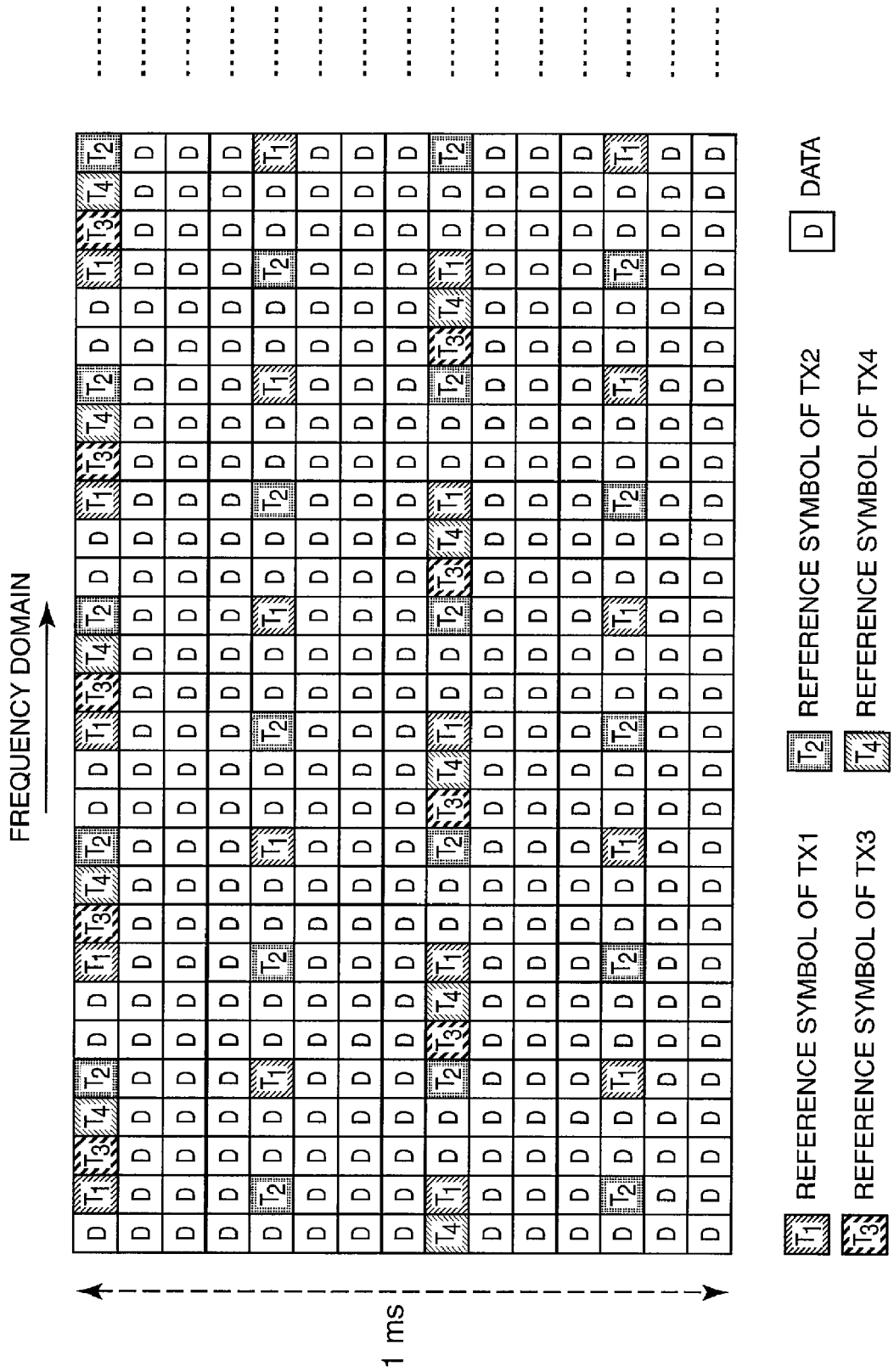
FIG. 1 is a time-frequency diagram of a pilot pattern for OFDM transmission.

FIG. 1 depicts a representative OFDM pilot pattern, as will likely be used in OFDM Long Term Evolution (LTE). The pilots are uniformly spaced across the frequency domain within an OFDM-symbol. It is currently proposed to include two OFDM-symbols per slot (0.5 ms) containing pilot symbols, one in the beginning of the slot and one towards the end of the slot.

Figure 2:
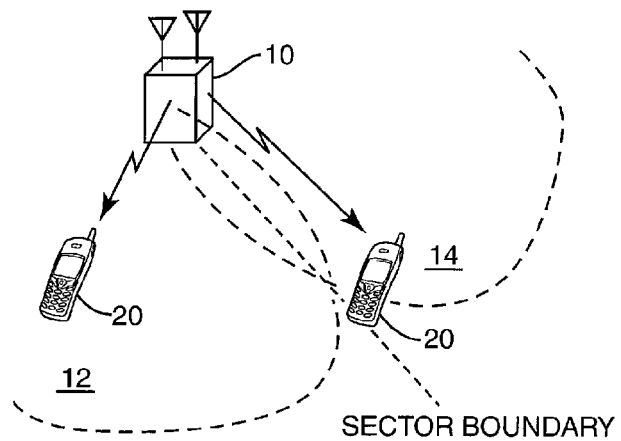
FIG. 2 is a functional block diagram of a sector boundary area of an OFDM cell.

FIG. 2 depicts a base station 10 transmitting OFDM signal in two sectors 12, 14. The sectors 12, 14 transmit on the same OFDM subcarriers. Orthogonal pilot patterns are used to differentiate the propagation channel emanating from the sectors 12, 14. As used herein, the term "orthogonal pilot pattern" means that the cross correlation between two orthogonal pilot patterns, at least over a predetermined sequence, is zero, and conversely, the cross correlation between non-orthogonal pilots patterns is non-zero. Mathematically, let $N_{Pilot}$ denote the number of pilots in frequency domain contained in an OFDM-symbol, and $P_{s,n}$ is the pilot symbol from sector s for the subcarrier indexed as n, n=0, ..., $N_{Pilot}-1$. Then, $$\sum_{k=k \cdot N_{Pattern}}^{(k+1) \cdot N_{Pattern}-1} P_{s_1,n}(P_{s_2,n})^* = \begin{cases} N_{Pattern}, & s_1 = s_2, \\ 0, & s_1 \neq s_2, \end{cases} \quad (1)$$

for $k = 0, \ldots, N_{Pilot}/N_{Pattern} - 1$

Figure 3:
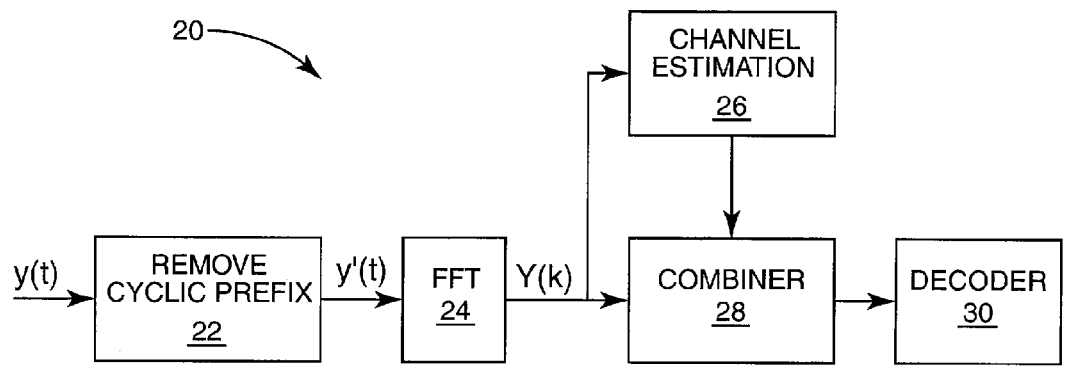
FIG. 3 is a functional block diagram of an OFDM receiver.

FIG. 3 depicts a representative functional block diagram of an OFDM receiver 20. The receiver 20 performs the operations of cyclic prefix removal 22, Fast Fourier transform (FFT) 24, channel estimation 26, combining 28, and decoding 30. The output of the FFT 24 is denoted as Y(k), k=0, ..., N−1.

If $H(k_n,n_{sym})$ is the propagation channel for subcarrier $k_n$, n=0, ..., $N_{Pilot}-1$ and OFDM-symbol indexed as $n_{sym}$, the propagation channel sample $\hat{H}(k_n,n_{sym})$ is calculated in the channel estimator 26 based on known pilot symbols. If the propagation channel is approximately constant across the subcarriers spanned by $N_{Pattern}$ consecutive pilot symbols, multiplication with the pilot sector pattern of interest will mitigate the interference from other sectors. That is, $$\hat{H}(k_n, n_{sym}) = \frac{1}{N_{Pattern}} \sum_{n=k \cdot N_{Pattern}}^{(k+1) \cdot N_{Pattern}} Y(k_n) \cdot (P_{0,n})^* \quad (2)$$

which removes the interference from all sectors not numbered as zero.

To obtain good channel estimates based on the channel samples, as much noise/inter-cell interference should be removed from the samples as possible, without distorting the estimation of the propagation channel. One method of "denoising" channel samples is to sum weighted channel samples over a predetermined number of consecutive pilot signals:

$$H^{DeN}(k_n, n_{sym}) = \sum_{m=0}^{N_{Pilot}-1} w_{n,m} \hat{H}(k_m, n_{sym}) \quad (3)$$

where $w_{n,m}$ are weights stored in a look-up table or calculated on the fly.

If stored in a look-up table, only the most significant $w_{n,m}$ weights should be stored. Similarly, a reduction in the number of calculations can be obtained in real-time if in equation (3) only a limited number of $w_{n,m}$ weights on each side of subcarrier $k_n$ are considered. In equation (3) we combine linearly the channel samples in the frequency domain to obtain a de-noised channel sample for subcarrier $k_n$. Since we only use channel samples in equation (3) coming from a single OFDM-symbol, the weights $w_{n,m}$ do not have to account for changes in AGC gain values or frequency corrections from the tracking AFC. If it is important not to change the amplitude of the de-noised channel estimates, then the weights should be normalized so that $|w_{n,0}+ \ldots +w_{n,Pilot}|=1$.

Propagation channel estimates for subcarriers not corresponding to a pilot subcarrier are found by linear interpolation or by piece-wise constant interpolation. This determines the propagation channel estimates (PcE) corresponding to the OFDM-symbols containing pilot symbols. To demodulate the data, the propagation channel for the remaining OFDM-symbols in the slot (that is, the ones not containing pilot symbols) must be evaluated. Two possibilities are considered.

In the first method, one propagation channel estimate is used for the entire slot. It is computed by averaging the existing propagation channel estimates.

In the second method, the remaining propagation channel estimates are computed by interpolating in the time domain. That is, for each subcarrier there are two propagation channel estimates, which are interpolated/extrapolated to obtain the missing propagation channel estimates in the slot.

A Doppler estimator may be used to discriminate between the first and second methods. When the receiver speed is high, time interpolation is used and when the receiver speed is low, time averaging is used to estimate the propagation channel.

The presented method requires only the propagation channel delay spread, that is, an estimate of the time lapse between the first and last arriving path.

The analysis is here carried out assuming one transmit antenna and one receive antenna. Since different transmit antennas will send pilots symbols on different subcarriers, the analysis is identical as when estimating the propagation channel between a given receive and transmit antenna. We are thus not exploiting the degree of receive antenna correlation in estimating the propagation channels in order to simplify the implementation.

First, we start by estimating the average phase rotation between adjacent pilot subcarriers. It is here assumed that the pilot subcarriers are uniformly spaced.

$$\gamma = \frac{\sum_{n=0}^{N_{Pilot}-2} \hat{H}(k_{n+1}, n_{sym})(\hat{H}(k_n, n_{sym}))^*}{\left|\sum_{n=0}^{N_{Pilot}-2} \hat{H}(k_{n+1}, n_{sym})(\hat{H}(k_n, n_{sym}))^*\right|} \quad (4)$$

Here $\gamma$ is of the type $e^{2\pi i \phi}$ for some phase angle $\phi$.

Second, the influence of the average phase rotation is removed:

$$\hat{H}^{Ph-rem}(k_n, n_{sym}) = \hat{H}(k_n, n_{sym}) \cdot \gamma^{-n} \quad (5)$$

The channel samples $\hat{H}^{Ph-rem}(k_n, n_{sym})$ will then show less variation in the frequency domain, which leads to a better de-noising. The main contribution to the phase rotation is when we select our first sample of the OFDM-symbol ahead of the OFDM-symbol start, that is, the first sample is part of the cyclic prefix. By removing the influence of the phase rotation, we can assume that our first sample is aligned with the OFDM-symbol start.

Third, let $H^{reg}$ be the column vector $H^{reg}=(H^{reg}(k_0, n_{sym}), \ldots, H(k_{N_{Pilots}-1}, n_{sym}))^t$ and solve for $H^{reg}$ in $$\min_{H^{reg}}(\|H^{reg} - \hat{H}\|^2 + \alpha\|\Delta \cdot H^{reg}\|^2) \quad (6)$$

where $\Delta$ is a $(N_{Pilots}-1) \times N_{Pilots}$ matrix, given by $$\Delta = \begin{pmatrix} 1 & -1 & 0 & \ldots & & 0 \\ 0 & 1 & -1 & 0 & \ldots & 0 \\ & & \ddots & & & \\ 0 & \ldots & 0 & 1 & -1 & 0 \\ 0 & \ldots & & 0 & 1 & -1 \end{pmatrix}. \quad (7)$$

In other words $$\|\Delta \cdot H^{reg}\|^2 = \sum_{n=0}^{N_{Pilots}-2} |H^{reg}(k_n, n_{sym}) - H^{reg}(k_{n+1}, n_{sym})|^2, \quad (8)$$

that is, a measure of the variation of $H^{reg}$ across the bandwidth. The larger $\alpha$ is the more we penalize variations between adjacent $H^{reg}$ subcarriers.

Differentiate with respect to $H^{reg}$ and solve for zero to obtain $$H^{reg} = (I + \alpha \Delta^H \Delta)^{-1} \hat{H}. \quad (9)$$

Denote $W = (I + \alpha \Delta^H \Delta)^{-1}$. Then row n corresponds to the weights $w_{n,0}, \ldots w_{n,N_{Pilots}-1}$ in equation (3) and $H^{reg}$ is a de-noised estimate of the propagation channel H.

Fourth, the de-noised samples are given by $$H^{DeN}(k_n, n_{sym}) = \left(\sum_{m=0}^{N_{Pilot}-1} w_{n,m} \hat{H}^{Ph-rem}(k_n, n_{sym})\right) \cdot \gamma^n. \quad (10)$$

Note that the phase rotation has been re-introduced here, given by the factor $\gamma$.

The propagation channel estimates for the remaining subcarriers are estimated using interpolation, that is, $$H^{PcE}(k, n_{sym}) = \quad (11)$$

$$H^{DeN}(k_n, n_{sym})\left(1 - \frac{k - k_n}{k_{n+1} - k_n}\right) + H^{DeN}(k_{n+1}, n_{sym})\left(\frac{k - k_n}{k_{n+1} - k_n}\right)$$

where $k_n \leq k < k_{n+1}$. Alternatively, to save memory and calculations, a piece-wise constant interpolation could be used $$H^{PcE}(k, n_{sym}) = H^{DeN}(k_n, n_{sym}), k_n - N_{Pilot\ spacing}/2 \leq k < k_n + N_{Pilot\ spacing}/2, \quad (12)$$

where $N_{Pilot\ spacing}$ is the number of sub-carriers between pilot subcarriers (currently six in 3GPP), that is, $k_{n+1} = k_n + N_{Pilot\ spacing}$.

If the Doppler estimate indicates that the receiver is moving at high speed, the remaining propagation channel estimates are interpolated in time:

$$H^{PcE}(k, n_{sym}) = H^{DeN}(k, n_{1,sym})\left(1 - \frac{n - n_{1,sym}}{n_{2,sym} - n_{1,sym}}\right) + \quad (13)$$

$$H^{DeN}(k_{n+1}, n_{2,sym})\left(\frac{n - n_{1,sym}}{n_{2,sym} - n_{1,sym}}\right)$$

where $n_{1,sym}$ and $n_{2,sym}$ are the indices of the OFDM-symbols containing pilots and for which we have already estimated the propagation channel. If, on the other hand, the Doppler indicates that the receiver is moving at low speed, the propagation channel estimates are averaged:

$$H^{PcE}(k, n_{sym}) = \frac{1}{2}(H^{DeN}(k, n_{1,sym}) + H^{DeN}(k_{n+1}, n_{2,sym})). \quad (14)$$

If it is known that the pilot symbols form an orthogonal sequence with length $N_{Pattern}$, and from the delay spread of the propagation channel it is known that the variation of the propagation channel in frequency domain can be approximated by a constant for $N_{Pattern}$ consecutive symbols, the propagation channel estimates covering $N_{Pattern}$ pilot symbols can be replaced with its averages.

Simulations indicate that at most two to three $\alpha$ values are needed, which depend only on the propagation channel delay spread. Larger $\alpha$ values are used if the delay spread is small and vice versa. As an initial value for $\alpha$ the lower of the values should be chosen until a delay spread estimation has been computed.

For every OFDM-symbol containing pilots we estimate an inter-cell interference sample. These could then be filtered, after being adjusted for different AGC gain factors, to give a final inter-cell interference estimate. Let $H_{i,j}^{PcE}(k_n, n_{sym})$ denote the de-noised propagation channel estimates from a particular cell, where $k_n=0, \ldots, N_{Pilot}-1$ enumerates the pilot subcarriers for OFDM symbol $n_{sym}$. Simulations indicate that a better inter-cell interference estimate is produced if the $H_{i,j}^{PcE}(k_n,n_{sym})$ are computed using more de-noising. In particular, two sets of $H_{i,j}^{PcE}(k_n,n_{sym})$ may be produced—a first set to use for the demodulation of data and a second set for computing the inter-cell interference.

Two scenarios are considered. In the first, the pilot and data subcarriers are subject to the same interference. This may occur, for example, if all cells transmit on all subcarriers with the same strength. In this case, for the purpose of propagation channel estimation, equation (2) is used to compute a first set of propagation channel samples $\hat{H}(k_n,n_{sym})$ that goes into the formula for the de-noised propagation channel estimates in equation (3). Because $\hat{H}$ is summed over a pattern of orthogonal pilot symbols, noise associated with the orthogonal signals is cancelled. The channel estimate of equation (3) then removes non-orthogonal noise from the channel estimate. Obviously, this will generate fewer samples and the weights in equation (3) might have to change. A straight-forward way of selecting the weights is to use every $N_{Pattern}$ weight, assuming a look-up table with the weights has been pre-computed for $N_{Pattern}$ equal to one.

For the interference estimation, let $H_{i,j}^{PcE}(k_n,n_{sym})$ denote the de-noised propagation channel estimates from a particular cell, where $k_n=0, \ldots, N_{Pilot}-1$ enumerates the pilot subcarriers for OFDM symbol $n_{sym}$. In this case, a second set of propagation channel samples $$\hat{H}_{i,j}(k_n, n_{sym}) = Y(k_n) \cdot (P_{0,n})^* \tag{15}$$

are computed from only the output of the FFT 24 and the pilot symbol—that is, without removing noise from orthogonal signals by summing over the pilot sequence. This explicitly retains the orthogonal noise component in $$\hat{H}.$$

The inter-cell interference sample is then computed as $$\hat{I}(n_{sym}) = \frac{1}{N_{Rx} \cdot N_{Tx} \cdot (N_{Pilot} - 1)} \tag{16}$$

$$\sum_{i=1}^{N_{Rx}} \sum_{j=1}^{N_{Tx}} \sum_{n=0}^{N_{Pilot}-1} \left| \hat{H}_{i,j}(k_n, n_{sym}) - H_{i,j}^{PcE}(k_n, n_{sym}) \right|^2.$$

This assumes that all receive antennas sees the same inter-cell interference. If this approximation does not hold true, an inter-cell interference sample per receive antenna is given by $$\hat{I}_i(n_{sym}) = \tag{17}$$

$$\frac{1}{N_{Tx} \cdot (N_{Pilot} - 1)} \sum_{j=1}^{N_{Tx}} \sum_{n=0}^{N_{Pilot}-1} \left| \hat{H}_{i,j}(k_n, n_{sym}) - H_{i,j}^{PcE}(k_n, n_{sym}) \right|^2.$$

Denote by $I(n_{sym})$ and $I_i(n_{sym})$ the filtered inter-cell interference samples.

In a second scenario, the pilot subcarriers are shared with other sectors, where the sector of interest is specified by a known orthogonal pattern, and we know that the subcarriers containing data are not subject to substantial interference from sectors with pilot patterns orthogonal to the desired pattern. This scenario is more likely in practice, as it represents better system design and planning.

Propagation channel estimation is carried out as described for the first scenario above. The estimates are used for demodulation of data and possibly for interference estimation.

For more accurate interference estimation in the second scenario, the second propagation channel samples $$\hat{H}$$

are replaced with the first propagation channel samples $\hat{H}$ given by equation (2) and the propagation channel estimates are as above. The inter-cell interference estimate is thus $$\hat{I}(n_{sym}) = \frac{1}{N_{Rx} \cdot N_{Tx} \cdot (N_{Pilot} - 1)} \tag{18}$$

$$\sum_{i=1}^{N_{Rx}} \sum_{j=1}^{N_{Tx}} \sum_{n=0}^{N_{Pilot}-1} \left| \hat{H}_{i,j}(k_n, n_{sym}) - H_{i,j}^{PcE}(k_n, n_{sym}) \right|^2.$$

Again, assuming that all receive antennas sees the same inter-cell interference. If not, the inter-cell interference sample per receive antenna is given by $$\hat{I}_i(n_{sym}) = \tag{19}$$

$$\frac{1}{N_{Tx} \cdot (N_{Pilot} - 1)} \sum_{j=1}^{N_{Tx}} \sum_{n=0}^{N_{Pilot}-1} \left| \hat{H}_{i,j}(k_n, n_{sym}) - H_{i,j}^{PcE}(k_n, n_{sym}) \right|^2.$$

Estimation of the interference is accurate if the frequency variation is small over the $N_{Pattern}$ pilots.

The inter-cell interference estimates—whether calculated under the first or second scenario considered herein—are used in the combiner 28 to increase the Signal-to-Noise Ratio (SNR) of a received signal prior to demodulating the data, improving receiver performance.

Next a more elaborate and exact way of removing the noise emanating from cells not identified by an orthogonal pilot sequence is described. The method may find particular applicability if we suspect there are large variations in the frequency domain of the propagation channel across the $N_{Pattern}$ pilots. The result of the method is a set of de-noised channel samples that are used to replace $H_{i,j}^{PcE}(k_n,n_{sym})$ in the interference estimation. The de-noised channel samples have been removed of noise not identified by one of the cells specified by an orthogonal pilot pattern. This special de-noising is done by replacing the third step in the method described above with the following.

Let $H^{reg}$ be the column vector $H^{reg}=(H^{reg}(k_0,n_{sym}), \ldots, H(k_{N_{pilot}-1},n_{sym}))^t$ and solve for $H^{reg}$ in $$\min_{H^{reg}} \left( \left\| H^{reg} - \hat{H} \right\|^2 + \beta \sum_{n=1}^{N_{Sectors}} \| O_n H^{reg} \|^2 \right). \quad (20)$$

Here, $$O_n = \begin{pmatrix} o_{n,0} & \cdots & o_{n,N_{Pattern}-1} & 0 & \cdots & & & 0 \\ & & & o_{n,N_{Pattern}} & \cdots & o_{n,2N_{Pattern}-1} & 0 & \cdots & 0 \\ & & & & \ddots & & & & \\ 0 & \cdots & & & 0 & & o_{n,(N_{Pattern}-1)N_{Pattern}} & \cdots & o_{n,N_{Pilots}-1} \end{pmatrix} \quad (21)$$

where $o_{n,m}$ equals the product of the pilot symbol from sector zero (the sector for which the propagation channel is being estimated) and the conjugate of the pilot symbol from sector n for subcarrier $k_m$.

To find the minimum, we differentiate with respect to $H^{reg}$ and solve for zero, yielding $$H^{reg} = \left( I + \beta \sum_{n=1}^{N_{Sectors}} O_n^H O_n \right)^{-1} \hat{H}. \quad (22)$$

Denote $$W = \left( I + \beta \sum_{n=1}^{N_{Sectors}} O_n^H O_n \right)^{-1}.$$

Then row n corresponds to the weights $w_{n,0}, \ldots w_{n,N_{pilots}-1}$ in equation (3) and $H^{reg}$ is a de-noised estimate of the propagation channel H.

Note that the inverse de-couples into a set of $N_{Pattern} \times N_{Pattern}$ matrices.

As with $\alpha$, the value of the parameter $\beta$ depends on the delay spread of the propagation channel for the sectors involved in the minimization of equation (20). As with $\alpha$, only a limited number of discrete values for $\beta$ should be necessary. Until the delay spread has been estimated a lower bound for $\beta$ is chosen. Observe, that the larger $\beta$ is, the more we emphasize that $H^{reg}$ is constant across pilot-symbols.

Figure 4:
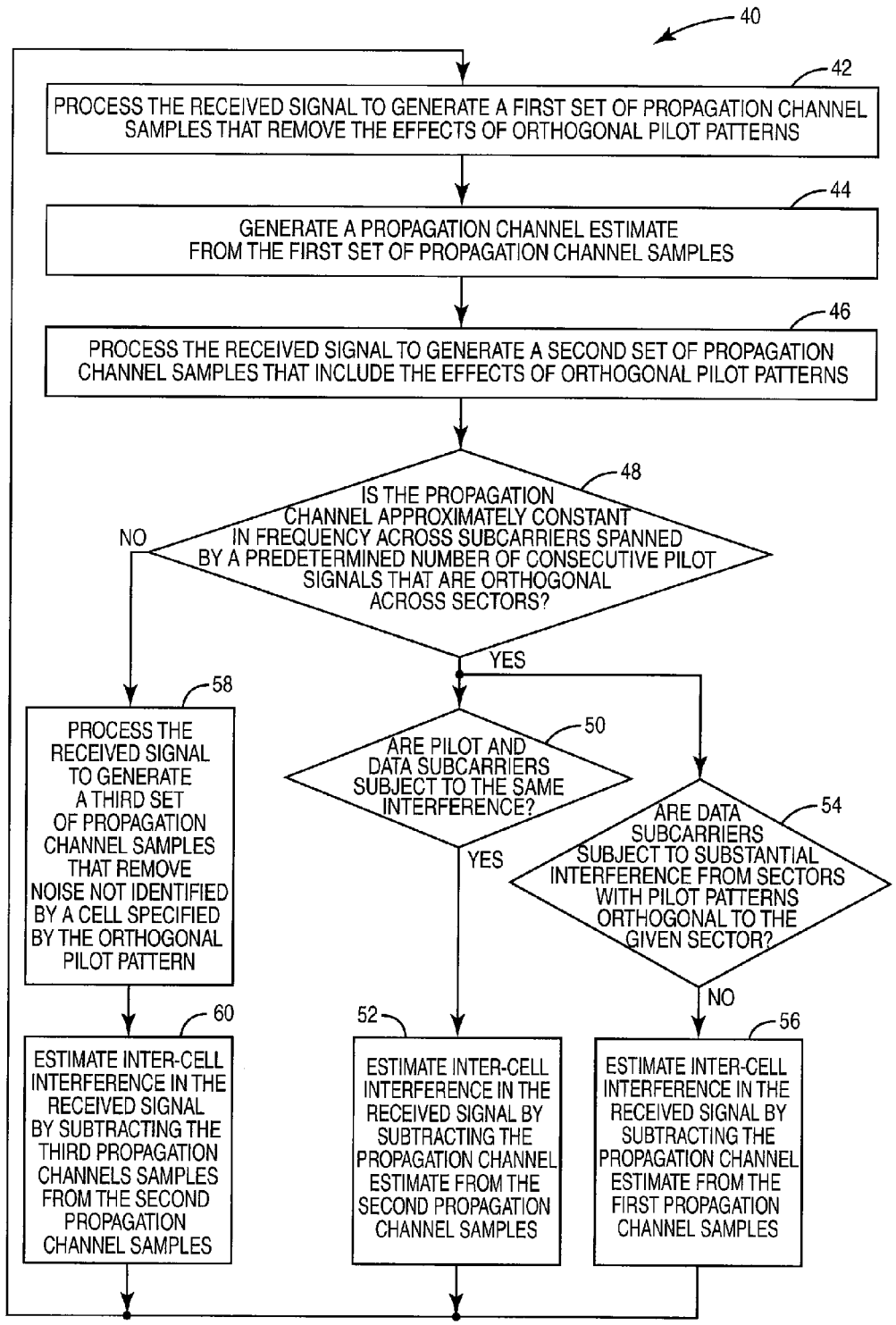
FIG. 4 is a flow diagram of a method of interference suppression.

FIG. 4 depicts a method 40 of estimating inter-cell interference under the scenarios postulated above. The received signal is processed to generate a first set of propagation channel samples that remove the effects of orthogonal pilot patterns, according to equation (2) (block 42). A propagation channel estimate is generated from the first set of propagation channel samples according to one of equations (11)-(14) (block 44). The received signal is processed to generate a second set of propagation channel samples that include the effects of orthogonal pilot patterns according to equation (15) (block 46). If the propagation channel is approximately constant in frequency across subcarriers spanned by a predetermined number of consecutive pilot signals that are orthogonal across sectors (block 48) and pilot and data subcarriers are subject to the same interference (block 50), inter-cell interference is estimated according to equation (17) (block 52). If the propagation channel is approximately constant in frequency across subcarriers spanned by a predetermined number of consecutive pilot signals that are orthogonal across sectors (block 48) and data subcarriers are not subject to substantial interference from sectors with pilot patterns orthogonal to the given sector (block 54), inter-cell interference is estimated according to equation (19) (block 56). If the propagation channel is not constant in frequency across subcarriers spanned by a predetermined number of consecutive pilot signals that are orthogonal across sectors (block 48), the received signal is processed to generate a third set of propagation channel samples that remove noise not identified by a cell specified by the orthogonal pilot pattern (block 58); and the inter-cell interference in the received signal is estimated by substituting $H^{reg}$ from equation (19) for $H_{i,j}^{PcE}(k_n,n_{sym})$ in equation (17) (block 60).

Note that, when using equation (2) for the propagation channel samples in the interference estimation (equation (18) and (19)) the estimated interference will be a magnitude $N_{Pattern}$ less because of the averaging in equation (2). This should be compensated for before using the interference estimation in, for example, the CQI-estimation.

In practice, it should be sufficient to compute the weights $w_{n,m}$ for a subcarrier in the middle of the bandwidth, giving a sequence $\tilde{w}_m, m=-M, \ldots M$. At most, ten to twenty pilot subcarriers on each side of the subcarrier to be de-noised should be enough—that is, M=10 or M=20. If a subcarrier is not surrounded by the necessary amount of pilots, zero values are inserted for these pilot samples when de-noising the pilot subcarrier of interest. Obviously, a scaling needs to be done to the de-noised pilot to reflect which weights were used. The scaling factor is the inverse of the sum of involved weights $\tilde{w}_m$. It should be enough to store two to three $\tilde{w}_m$ vectors, each one reflecting a different propagation delay spread.

In the time domain, we could, as shown above, either interpolate between the pilots if the Doppler is high, or average per subcarrier the de-noised pilots over a slot if the Doppler is low. It could possibly be of benefit for stationary conditions to also average over two or three slots. The simplest way of doing averaging over several slots is only to look back in time when averaging, thus avoiding storing large amount of received data. Even when only looking back in time, we need to compensate de-noised pilots with AGC gain changes as well as changes in the transmission amplitudes of the pilots, assuming these are known.

According to the present invention, more de-noising is used to generate channel estimates used in interference estimation than is necessary for corresponding channel estimates used for demodulating the data. For a propagation channel exhibiting a large variation in the frequency domain, the present invention increases the quality of interference estimation by exploiting the orthogonality of the pilot pattern.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of accurately estimating inter-cell interference in a received signal transmitted in a given sector in an OFDM communication system receiver, comprising, when pilot and data subcarriers are subject to the same interference and the propagation channel is approximately constant across subcarriers spanned by a predetermined number of frequency-contiguous pilot signals having pilot patterns that are orthogonal across sectors, such that the cross correlation between two orthogonal pilot patterns over a predetermined sequence is zero:

processing the received signal to generate a first set of propagation channel samples that remove the effects of orthogonal pilot patterns;

generating a propagation channel estimate from the first set of propagation channel samples;

processing the received signal to generate a second set of propagation channel samples that include the effects of orthogonal pilot patterns; and estimating inter-cell interference in the received signal by subtracting the propagation channel estimate from the second propagation channel samples.

2. The method of claim 1 wherein processing the received signal to generate a first set of propagation channel samples that remove the effects of orthogonal pilot patterns comprises summing, over the predetermined number of consecutive pilot signals, the product of a Fast Fourier Transform (FFT) of the received signal and the complex conjugate of a known pilot symbol associated with the transmitting sector.

3. The method of claim 2 wherein the first set of propagation channel samples is calculated as $$\hat{H}(k_n, n_{sym}) = \frac{1}{N_{Pattern}} \sum_{n=k \cdot N_{Pattern}}^{(k+1) \cdot N_{Pattern}} Y(k_n) \cdot (P_{0,n})^*$$

where $N_{Pattern}$ are frequency-contiguous pilot symbols that are orthogonal across sectors;

$Y(k)$ is the output of a receiver FFT for subcarrier $k_n$, $n=0, \ldots, N_{Pilot}-1$ for $N_{Pilot}$ pilots in the frequency domain contained in an OFDM-symbol;

$P_{s,n}$ is the pilot symbol from sector s for the subcarrier n; and $\hat{H}(k_n, n_{sym})$ is the propagation channel sample for subcarrier $k_n$, $n=0, \ldots, N_{Pilot}-1$ and OFDM-symbol indexed as $n_{sym}$.

4. The method of claim 1 wherein processing the received signal to generate a second set of propagation channel samples that include the effects of orthogonal pilot patterns comprises multiplying a Fast Fourier Transform (FFT) of the received signal and the complex conjugate of a known pilot symbol associated with the transmitting sector.

5. The method of claim 4 wherein the second set of propagation channel samples is calculated as $$\hat{\hat{H}}(k, n_{sym}) = Y(k) P_0^*.$$

6. The method of claim 1 further comprising de-noising the first set of propagation channel samples by linearly combining weighted first propagation channel samples in the frequency domain.

7. The method of claim 6 wherein the de-noised propagation channel samples are calculated as $$H^{DeN}(k_n, n_{sym}) = \sum_{m=0}^{N_{Pilot}-1} w_{n,m} \hat{H}(k_m, n_{sym})$$

where $w_{n,m}$ are weighting values.

8. The method of claim 7 wherein $w_{n,m}$ values are stored in a lookup table.

9. The method of claim 7 wherein $w_{n,m}$ values are dynamically calculated.

10. The method of claim 7 wherein $w_{n,m}$ values normalized such that $|w_{n,0} + \ldots + w_{n,Pilot}| = 1$.

11. The method of claim 1 wherein the inter-cell interference estimate is calculated for each receive antenna as $$\hat{I}_i(n_{sym}) = \frac{1}{N_{Tx} \cdot (N_{Pilot}-1)} \sum_{j=1}^{N_{Tx}} \sum_{n=0}^{N_{Pilot}-1} \left| \hat{\hat{H}}_{i,j}(k_n, n_{sym}) - H_{i,j}^{PcE}(k_n, n_{sym}) \right|^2$$

where $I_i(n_{sym})$ is an inter-cell interference symbol;

$H_{i,j}^{PcE}(k_n, n_{sym})$ are the de-noised propagation channel estimates from a particular cell;

$k_n = 0, \ldots, N_{Pilot}-1$ enumerate the pilot subcarriers for OFDM symbol $n_{sym}$; and $$\hat{\hat{H}}(k, n_{sym})$$

are the second propagation channel samples.

12. The method of claim 1 further comprising, when pilot subcarriers are shared with other sectors, data subcarriers are not subject to substantial interference from sectors with pilot patterns orthogonal to the given sector such that the cross correlation between two orthogonal pilot patterns over a predetermined sequence is zero, and the propagation channel is approximately constant across subcarriers spanned by a predetermined number of frequency-contiguous pilot signals that are orthogonal across sectors:

estimating inter-cell interference in the received signal by subtracting the propagation channel estimate from the first propagation channel samples.

13. The method of claim 12 wherein the inter-cell interference estimate is calculated for each receive antenna as $$\hat{I}_i(n_{sym}) = \frac{1}{N_{Tx} \cdot (N_{Pilot}-1)} \sum_{j=1}^{N_{Tx}} \sum_{n=0}^{N_{Pilot}-1} \left| \hat{H}_{i,j}(k_n, n_{sym}) - H_{i,j}^{PcE}(k_n, n_{sym}) \right|^2$$

where $I_i(n_{sym})$ is an inter-cell interference symbol;

$H_{i,j}^{PcE}(k_n, n_{sym})$ are the de-noised propagation channel estimates from a particular cell;

$k_n=0, \ldots, N_{Pilot}-1$ enumerate the pilot subcarriers for OFDM symbol $n_{sym}$; and $\hat{H}(k,n_{sym})$ are the first propagation channel samples.

14. The method of claim 1 further comprising, when the propagation channel is not constant in frequency across subcarriers spanned by a predetermined number of frequency-contiguous pilot signals having pilot patterns that are orthogonal across sectors such that the cross correlation between two orthogonal pilot patterns over a predetermined sequence is zero:

processing the received signal to generate a third set of propagation channel samples that remove noise not identified by a cell specified by the orthogonal pilot pattern; and estimating inter-cell interference in the received signal by subtracting the third propagation channels samples from the second propagation channel samples.

15. The method of claim 14 wherein the third set of propagation channel samples is calculated as $$H^{reg} = \left(I + \beta \sum_{n=1}^{N_{Sectors}} O_n^H O_n\right)^{-1} \hat{H}$$

where $H^{reg}$ is the third set of propagation channel samples; I is the identity matrix;

$$O_n = \begin{pmatrix} o_{n,0} & \cdots & o_{n,N_{Pattern}-1} & 0 & \cdots & & & 0 \\ & & & o_{n,N_{Pattern}} & \cdots & o_{n,2N_{Pattern}-1} & 0 & \cdots & 0 \\ & & & & & \ddots & & & \\ 0 & \cdots & & & & 0 & o_{n,(N_{Pattern}-1)N_{Pattern}} & \cdots & o_{n,N_{Pilots}-1} \end{pmatrix}$$

where $o_{n,m}$ is the product of the pilot symbol from the given sector and the conjugate of the pilot symbol from sector n for subcarrier $k_m$;

$\hat{H}$ is the set of second propagation channel samples; and
β is a scaling factor.

16. An OFDM communication system receiver, comprising:

a receiver operative to receive a signal transmitted in a given sector;

a channel estimation circuit operative to detect when pilot and data subcarriers are subject to the same interference and the propagation channel is approximately constant across subcarriers spanned by a predetermined number of frequency-contiguous pilot signals having pilot patterns that are orthogonal across sectors such that the cross correlation between two orthogonal pilot patterns over a predetermined sequence is zero, and to process the received signal to generate a first set of propagation channel samples that remove the effects of orthogonal pilot patterns;

generate a propagation channel estimate from the first set of propagation channel samples;

process the received signal to generate a second set of propagation channel samples that include the effects of orthogonal pilot patterns; and estimate inter-cell interference in the received signal by subtracting the propagation channel estimate from the second propagation channel samples.

17. The receiver of claim 16 further comprising a Fast Fourier Transform (FFT) circuit, and wherein the channel estimation circuit is operative to sum, over the predetermined number of frequency-contiguous pilot signals, the product of an FFT of the received signal and the complex conjugate of a known pilot symbol associated with the transmitting sector to generate the first set of propagation channel samples.

18. The receiver of claim 17 wherein the channel estimation circuit calculates the first set of propagation channel samples as $$\hat{H}(k_n, n_{sym}) = \frac{1}{N_{Pattern}} \sum_{n=k \cdot N_{Pattern}}^{(k+1) \cdot N_{Pattern}} Y(k_n) \cdot (P_{0,n})^*$$

where $N_{Pattern}$ are frequency-contiguous pilot symbols having pilot patterns that are orthogonal across sectors such that the cross correlation between two orthogonal pilot patterns over a predetermined sequence is zero;

Y(k) is the output of a receiver FFT for subcarrier $k_n$, $n=0, \ldots, N_{Pilot}-1$ for $N_{Pilot}$ pilots in the frequency domain contained in an OFDM-symbol;

$P_{s,n}$ is the pilot symbol from sector s for the subcarrier n; and $\hat{H}(k_n,n_{sym})$ is the propagation channel sample for subcarrier $k_n$, $n=0,\ldots,N_{Pilot}-1$ and OFDM-symbol indexed as $n_{sym}$.

19. The receiver of claim 17 wherein the channel estimation circuit is operative to multiply a an FFT of the received signal and the complex conjugate of a known pilot symbol associated with the transmitting sector to generate the second set of propagation channel samples.

20. The receiver of claim 19 wherein the channel estimation circuit calculates the second set of propagation channel samples as $$\hat{H}(k, n_{sym}) = Y(k) P_0^*.$$

21. The receiver of claim 16 wherein the channel estimation circuit is further operative to de-noise the first set of propagation channel samples by linearly combining weighted first propagation channel samples in the frequency domain.

22. The receiver of claim 21 wherein the channel estimation circuit calculates the de-noised channel samples as $$H^{DeN}(k_n, n_{sym}) = \sum_{m=0}^{N_{pilot}-1} w_{n,m} \hat{H}(k_m, n_{sym})$$

where $w_{n,m}$ are weighting values.

23. The receiver of claim 22 wherein $w_{n,m}$ values are stored in a lookup table.

24. The receiver of claim 22 wherein $w_{n,m}$ values are dynamically calculated.

25. The receiver of claim 22 wherein $w_{n,m}$ values normalized such that $|w_{n,0}+ \ldots +w_{n,Pilot}|=1$.

26. The receiver of claim 16 wherein the channel estimation circuit calculates the inter-cell interference estimate for each receive antenna as $$\hat{I}_i(n_{sym}) = \frac{1}{N_{Tx} \cdot (N_{Pilot}-1)} \sum_{j=1}^{N_{Tx}} \sum_{n=0}^{N_{Pilot}-1} \left| \hat{H}_{i,j}(k_n, n_{sym}) - H_{i,j}^{PcE}(k_n, n_{sym}) \right|^2$$

where $I_i(n_{sym})$ is an inter-cell interference symbol;
$H_{i,j}^{PcE}(k_n, N_{sym})$ are the de-noised propagation channel estimates from a particular cell;
$k_n=0, \ldots, N_{Pilot}-1$ enumerate the pilot subcarriers for OFDM symbol $n_{sym}$; and $$\hat{\hat{H}}(k, n_{sym})$$

are the second propagation channel samples.

27. The receiver of claim 16 wherein the channel estimation circuit is further operative to detect when pilot subcarriers are shared with other sectors, data subcarriers are not subject to substantial interference from sectors with pilot patterns orthogonal to the given sector, and the propagation channel is approximately constant across subcarriers spanned by a predetermined number of frequency-contiguous pilot signals having pilot patterns that are orthogonal across sectors such that the cross correlation between two orthogonal pilot patterns over a predetermined sequence is zero, and to subtract the propagation channel estimate from the first propagation channel samples to estimate inter-cell interference in the received signal.

28. The receiver of claim 27 wherein the channel estimation circuit calculates the inter-cell interference estimate for each receive antenna as $$\hat{I}_i(n_{sym}) = \frac{1}{N_{Tx} \cdot (N_{Pilot}-1)} \sum_{j=1}^{N_{Tx}} \sum_{n=0}^{N_{Pilot}-1} \left| \hat{H}_{i,j}(k_n, n_{sym}) - H_{i,j}^{PcE}(k_n, n_{sym}) \right|^2$$

where $I_i(n_{sym})$ is an inter-cell interference symbol;
$H_{i,j}^{PcE}(k_n, n_{sym})$ are the de-noised propagation channel estimates from a particular cell;
$k_n=0, \ldots, N_{Pilot}-1$ enumerate the pilot subcarriers for OFDM symbol $n_{sym}$; and
$\hat{H}(k, n_{sym})$ are the first propagation channel samples.

29. The receiver of claim 16 wherein the channel estimation circuit is further operative to detect when the propagation channel is not constant in frequency across subcarriers spanned by a predetermined number of frequency-contiguous pilot signals having pilot patterns that are orthogonal across sectors such that the cross correlation between two orthogonal pilot patterns over a predetermined sequence is zero, and to process the received signal to generate a third set of propagation channel samples that remove noise not identified by a cell specified by the orthogonal pilot pattern; and
estimate inter-cell interference in the received signal by subtracting the third propagation channels samples from the second propagation channel samples.

30. The receiver of claim 29 wherein the channel estimation circuit calculates the third set of propagation channel samples as $$H^{reg} = \left( I + \beta \sum_{n=1}^{N_{Sectors}} O_n^H O_n \right)^{-1} \hat{\hat{H}}$$

where $H^{reg}$ is the third set of propagation channel samples;
I is the identity matrix;

$$O_n = \begin{pmatrix} o_{n,0} & \cdots & o_{n,N_{Pattern}-1} & 0 & \cdots & & & 0 \\ & & & o_{n,N_{Pattern}} & \cdots & o_{n,2N_{Pattern}-1} & 0 & \cdots & 0 \\ & & & & \ddots & & & & \\ 0 & \cdots & & & & 0 & o_{n,(N_{Pattern}-1)N_{Pattern}} & \cdots & o_{n,N_{Pilots}-1} \end{pmatrix}$$

where $o_{n,m}$ is the product of the pilot symbol from the given sector and the conjugate of the pilot symbol from sector n for subcarrier $k_m$;

$$\hat{\hat{H}}$$

is the set of second propagation channel samples; and
$\beta$ is a scaling factor.

* * * * *

UNITED STATES PATENT AND TRADEMARK OFFICE
CERTIFICATE OF CORRECTION

| | | |
|---|---|---|
| PATENT NO. | : 8,279,743 B2 | Page 1 of 1 |
| APPLICATION NO. | : 11/756172 | |
| DATED | : October 2, 2012 | |
| INVENTOR(S) | : Jonsson | |

It is certified that error appears in the above-identified patent and that said Letters Patent is hereby corrected as shown below:

On the Title Page, in Item (56), under "FOREIGN PATENT DOCUMENTS", in Column 2, Line 3, delete "EP 1 4999 059 A1* 1/2005".

In the Specification:

In Column 8, Line 67, delete "$n_{sym})^{t}$" and insert -- $n_{sym}))^{t}$ --, therefor.

In the Claims:

In Column 15, Line 23, in Claim 26, delete "$(k_n, N_{sym})$" and insert -- $(k_n, n_{sym})$ --, therefor.

Signed and Sealed this
Twelfth Day of May, 2015

Michelle K. Lee
*Director of the United States Patent and Trademark Office*